(12) United States Patent
Donini et al.

(10) Patent No.: US 11,369,058 B2
(45) Date of Patent: Jun. 28, 2022

(54) FORWARD-LOOKING PERCEPTION INTERFACE AND CONTROL

(71) Applicant: Deere & Company, Moline, IL (US)

(72) Inventors: Mario L. Donini, Bettendorf, IA (US); Colin D. Engel, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 771 days.

(21) Appl. No.: 16/357,430

(22) Filed: Mar. 19, 2019

(65) Prior Publication Data
US 2020/0296892 A1    Sep. 24, 2020

(51) Int. Cl.
| | |
|---|---|
| *A01D 41/127* | (2006.01) |
| *G05D 1/00* | (2006.01) |
| *G01F 11/24* | (2006.01) |
| *G06Q 50/02* | (2012.01) |
| *G01F 1/06* | (2006.01) |

(52) U.S. Cl.
CPC ..... *A01D 41/1271* (2013.01); *A01D 41/1278* (2013.01); *G01F 1/06* (2013.01); *G01F 11/24* (2013.01); *G05D 1/0016* (2013.01); *G06Q 50/02* (2013.01)

(58) Field of Classification Search
CPC ............ A01D 41/1271; A01D 41/1278; A01D 41/127; G01F 1/06; G01F 11/24; G05D 1/0016; G06Q 50/02; A01B 69/001; A01B 79/005
See application file for complete search history.

(56) References Cited

U.S. PATENT DOCUMENTS

| | | |
|---|---|---|
| 5,666,793 A | 9/1997 | Bottinger |
| 6,041,582 A | 3/2000 | Tiede et al. |
| 7,499,796 B2 | 3/2009 | Listle et al. |
| 9,750,192 B2 | 9/2017 | Mackin et al. |
| 9,826,682 B2 | 11/2017 | Blank et al. |
| 9,892,376 B2 | 2/2018 | Pfeiffer et al. |
| 10,091,932 B2 | 10/2018 | Neitemeier et al. |
| 11,240,961 B2 * | 2/2022 | Anderson ............ A01D 41/127 |
| 2003/0066277 A1 | 4/2003 | Behnke |
| 2006/0241838 A1 | 10/2006 | Mongiardo et al. |
| 2007/0069914 A1 | 3/2007 | Lenneman et al. |
| 2010/0153884 A1 | 6/2010 | Chow et al. |
| 2014/0298259 A1 | 10/2014 | Meegan et al. |
| 2015/0199360 A1 | 7/2015 | Pfeiffer et al. |

(Continued)

*Primary Examiner* — Russell Frejd (57) ABSTRACT

In accordance with an example embodiment, an agricultural work vehicle includes a propulsion system for modifying vehicle speed, a harvesting system for harvesting crop, a perception system having at least one camera with a field of view of a forward zone in front of the vehicle, and a controller. The controller communicates with the propulsion, harvesting, and perception systems, and is configured to receive the perception signal, identify a harvest condition in the forward zone, adjust an operation setting of the propulsion system or harvesting system, and generate a forward-looking perception interface for a display screen. The forward-looking perception interface includes a forward zone area displaying the field of view and a status area displaying at least one harvest condition identified. The status area also displays a time and a sensitivity level associated with the at least one harvest condition identified.

15 Claims, 4 Drawing Sheets

(56) References Cited

U.S. PATENT DOCUMENTS

| | | |
|---|---|---|
| 2015/0199630 A1 | 7/2015 | Pfeiffer et al. |
| 2015/0324068 A1 | 11/2015 | Bellare et al. |
| 2016/0041803 A1 | 2/2016 | Markov et al. |
| 2016/0078391 A1 | 3/2016 | Blank et al. |
| 2017/0055444 A1 | 3/2017 | Mahieu et al. |
| 2017/0090741 A1 | 3/2017 | Tentinger et al. |
| 2017/0112061 A1 | 4/2017 | Meyer |
| 2017/0113548 A1 | 4/2017 | Lucas et al. |
| 2017/0115832 A1 | 4/2017 | Lucas et al. |
| 2017/0115833 A1 | 4/2017 | Lucas et al. |
| 2017/0115843 A1 | 4/2017 | Lucas et al. |
| 2017/0115862 A1 | 4/2017 | Stratton et al. |
| 2017/0115863 A1 | 4/2017 | Lucas et al. |
| 2017/0142900 A1 | 5/2017 | Mahieu et al. |
| 2018/0025254 A1* | 1/2018 | Wellington ............ G06V 10/42 382/110 |
| 2018/0084718 A1 | 3/2018 | Baumgarten et al. |
| 2018/0098490 A1 | 4/2018 | Missotten et al. |
| 2018/0359919 A1 | 12/2018 | Blank et al. |
| 2018/0362053 A1* | 12/2018 | Isa ............................ B60R 1/00 |
| 2018/0364652 A1 | 12/2018 | Blank et al. |
| 2018/0364698 A1 | 12/2018 | Blank et al. |
| 2019/0098825 A1 | 4/2019 | Neitemeier et al. |
| 2021/0007277 A1* | 1/2021 | Anderson .......... A01D 41/1278 |

\* cited by examiner

FORWARD-LOOKING PERCEPTION INTERFACE AND CONTROL

TECHNICAL FIELD

The present disclosure generally relates to an agricultural work vehicle. An embodiment of the present disclosure relates to the interface and control for a forward-looking perception system for the harvesting vehicle.

BACKGROUND

Agricultural work vehicles may be used to harvest any number of different crops from a field. These vehicles may be self-propelled vehicles dedicated to harvesting operations, often referred to as combines or harvesters, or a combination of a tractor and an attached harvesting implement.

Harvesting vehicles may encounter harvesting conditions which change during a harvesting operation. Crop may vary in its yield, moisture content, strength, or thickness, or the degree to which it suffered from wind, pest, or disease pressures. The operation settings for the harvesting vehicle, such as vehicle and harvesting system speeds among many other settings which may be altered, may be optimized to improve the performance of the harvesting vehicle in the particular conditions encountered. One approach is that an operator or farm manager may attempt to choose a static optimization of these factors by choosing operation settings which are acceptable for all the different harvest conditions the vehicle is expected to experience in that harvesting operation even if the setting are not optimal for many of the specific conditions encountered. Another approach is that an operator or farm manager may instead choose to dynamically optimize these operation settings and change the operation settings as the harvesting vehicle encounters different conditions, but this requires the operator to develop this skill and adds an additional task for the operator to manage during the harvesting operation. Another approach is that the harvesting vehicle may contain yield sensors and utilize its power output and speed to estimate the harvesting conditions it encountered in recent history and change operation settings accordingly, but this approach is reactive and may not fully optimize the operating settings through the entirety of the harvesting condition encountered.

SUMMARY

Various aspects of examples of the present disclosure are set out in the claims.

According to a first aspect of the present disclosure, an agricultural work vehicle includes a propulsion system, a harvesting system, a perception system, and a controller. The propulsion system is configured to modify a speed of the vehicle. The harvesting system is configured to harvest a crop. The perception system is configured to provide a perception signal, and includes at least one camera, the one camera having a field of view including at least a portion of a forward zone in front of the vehicle. The controller is in communication with the propulsion system, harvesting system, and perception system. The controller is configured to receive the perception signal, identify (using the perception signal) a harvest condition in the forward zone, adjust (using the harvest condition) an operation setting of the propulsion system or harvesting system, and generate a forward-looking perception interface for a display screen. The forward-looking perception interface includes a forward zone area displaying (using the perception signal) the field of view and a status area displaying at least one harvest condition identified. The status area also displays a time and a sensitivity level associated with the at least one harvest condition identified.

According to a second aspect of the present disclosure, the forward-looking perception interface may further include a forward zone area displaying the field of view and an area highlighting a portion of crop in the field of view having the harvest condition.

According to a third aspect of the present disclosure, the sensitivity adjustment window displays sensitivity settings which the controller uses to determine the sensitivity level, and at least a portion of the sensitivity settings are user-modifiable in the sensitivity adjustment window.

According to a fourth aspect of the present disclosure, the status area further includes a vehicle settings icon associated with the harvest condition identified, and the controller is configured to open a vehicle settings window when the vehicle settings icon is touched, and the vehicle settings window displays vehicle settings which the controller uses to operate the propulsion system or harvesting system.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 4 of the drawings.

Figure 1:
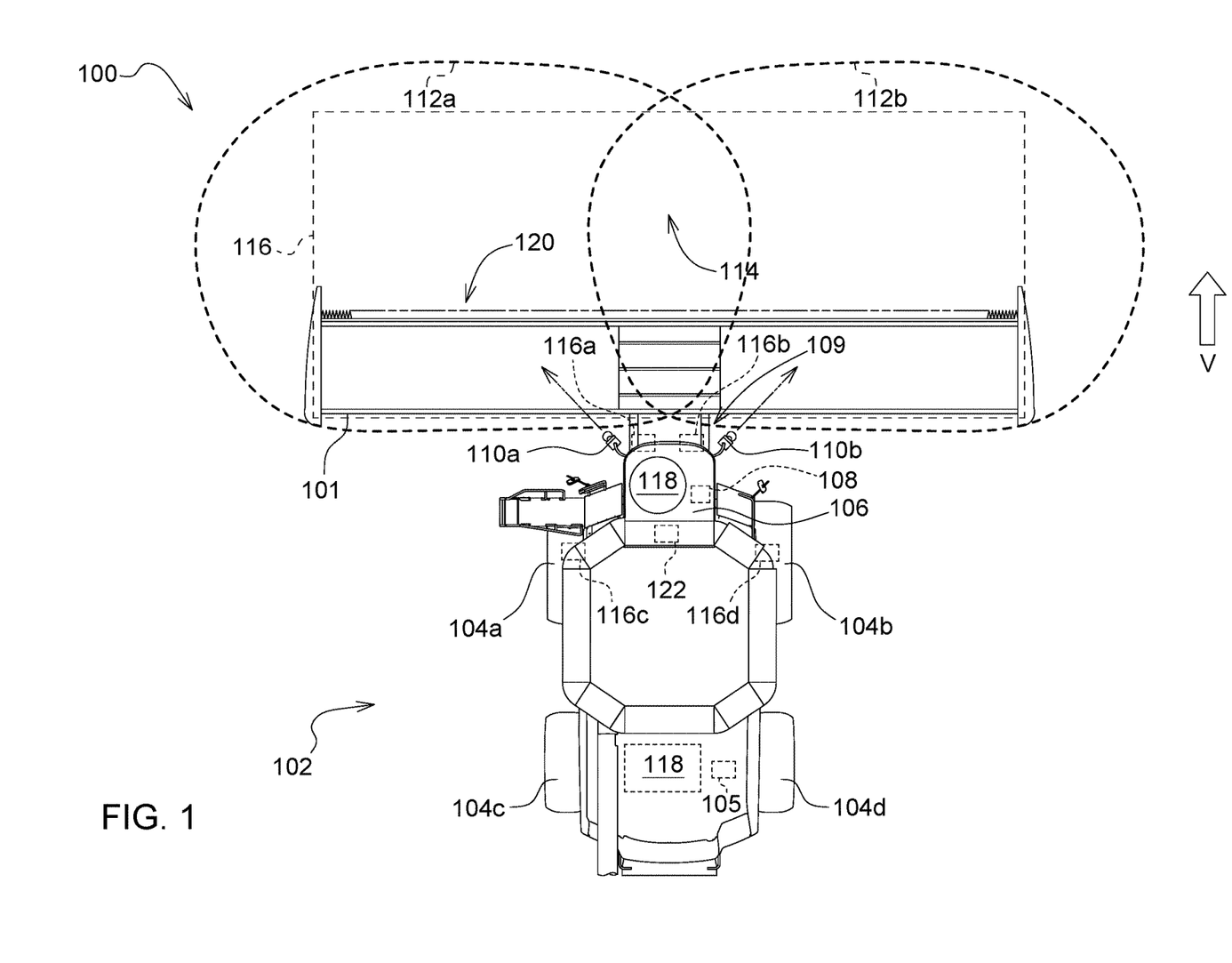
FIG. 1 is a top plan view of a work vehicle, in this case a combine harvester, in accordance with an embodiment of the present disclosure.

FIG. 1 illustrates a work vehicle 100, in this embodiment a combine harvester with a harvesting head 101 attached. The work vehicle 100 is traversing a ground surface 102 in a forward direction V supported by four tires, 104a (front left), 104b (front right), 104c (rear left), and 104d (rear right). The work vehicle 100 has steerable rear wheels, so tires 104c and 104d may be steered at an angle relative to the remainder of work vehicle 100 in order to steer the vehicle. A steering angle sensing system 105 is configured to sense the steering angle of the work vehicle 100, for example by measuring the angle between certain components of the steering mechanism (e.g., steering links) using a rotary sensor and then using a kinematic model to determine a steering angle based on that measured angle. In alternative embodiments, the steering angle of the work vehicle 100 may be determined through alternative means, including through sensors configured to sense the position of other parts of the steering system.

An operator seated in the operator station 106 is operating the work vehicle 100. A display screen 108, sometimes referred to as a monitor or a screen, is located within the operator station 106 and positioned so as to be viewable by the operator during operation of the work vehicle 100. The display screen 108 may display any number of different items for the operator, such as the performance of the work vehicle 100, a map of the location of the work vehicle 100, or other displayed interfaces as described later in this disclosure.

The work vehicle 100 has a perception system 109, including a plurality of cameras 110a and 110b, which are attached to the work vehicle 100 in different locations to provide two different individual fields of view 112a and 112b that collectively form a perception system field of view 114, which covers a forward zone 116. Camera 110a is positioned at the front left of the work vehicle 100 near the roof of the operator station 106 so as to provide an individual field of view 112a of a portion of the ground surface 102 in front of the work vehicle 100 and the harvesting head 101. Similarly, camera 110b is positioned at the front right of the work vehicle 100 near the roof of the operator station 106 so as to provide an individual field of view 112b of a portion of the ground surface 102 in front of the work vehicle 100 and the harvesting head 101. The camera types and lens used, as well as the position of the cameras, may be chosen to achieve different fields of view, depending on the application and the needed size of the forward zone 116 desired to be covered. For example, a larger field of view may be achieved by using a camera with a fish-eye lens placed high on the vehicle, with the upper limit to the field of view limited by lens optics and the height at which the camera can be placed. In alternative embodiments, the perception system 109 may include a single camera with an appropriate lens and placed at a sufficient height relative to the work vehicle 100 to capture the field of view necessary for the work vehicle 100. As another example, a smaller field of view may be achieved using a narrow angle lens and/or a lower camera placement, which reduces the field of view but may provide greater resolution, reduced distortion, or may frame the field of view to focus on a particular area of interest. Each of the cameras 110a-b provides a signal directly to a vehicle-level controller, which is collectively a perception signal, but in other embodiments the perception system 109 is a subsystem with its own controller that receives signals from each of the cameras 110a-b and processes those signals to produce a perception signal that is then sent to a vehicle-level controller.

The forward zone 116 is an area of ground immediately in front of the work vehicle 100 and including the at least the forward portion of the harvesting head 101 where crop is being processed. This forward zone 116 is the zone of land over which the harvesting head 101 will next pass as the work vehicle 100 moves in the forward direction V and the crop which has begun to be processed by the work vehicle 100. The work vehicle 100 will be driven in the forward direction V by its propulsion system 118, in this embodiment a diesel engine and hydraulic transmission (i.e., hydrostatic) which transmit tractive force to the ground surface 102 via wheels. An example propulsion system is described in further detail in U.S. Pat. No. 9,750,192, the contents of which are incorporated herein by reference.

The perception system 109 has a field of view including at least a portion of the forward zone 116, in this case the entirety of the forward zone 116, and for this reason the perception system 109 may also be referred to as a forward-looking perception system. If the work vehicle 100 is executing a harvesting operation, the forward zone 116 will often contain the crop to be harvested, for example corn, soybeans, wheat, sugar, or cotton, to name just a few potential crops. As the work vehicle 100 moves forward, unharvested crop will be taken into the harvesting head 101, which is the beginning of the harvesting system 120 of the work vehicle 100. In addition to the harvesting head 101, the harvesting system 120 includes a thresher, separator, cleaning shoe, elevators, residue handling system, and other harvesting components designed to separate and store just the desired part of the crop. An example harvesting system is described in further detail in U.S. Pat. No. 9,961,831, the contents of which are incorporated herein by reference.

The steering angle sensing system 105, display screen 108, cameras 110a-b, propulsion system 118, and harvesting system 120 are each in communication with a controller 122. As used herein, "controller" is intended to be used consistent with how the term is used by a person of skill in the art, and refers to a computing component with processing, memory, and communication capabilities which is utilized to control or communicate with one or more other components. In certain embodiments, a controller may also be referred to as a control unit, vehicle control unit (VCU), engine control unit (ECU), transmission control unit (TCU), or hydraulic, electrical or electro-hydraulic controller. In certain embodiments, a controller may be configured to receive input signals in various formats (e.g., hydraulic signals, voltage signals, current signals, CAN messages, optical signals, radio signals), and to output command signals in various formats (e.g., hydraulic signals, voltage signals, current signals, CAN messages, optical signals, radio signals). The controller 122, sometimes referred to as a vehicle control unit (VCU) in this embodiment where multiple systems of the vehicle are controlled by a central controller, receives signals from each of the steering angle sensing system 105 (steering angle signal), display screen 108 (operator input on a touchscreen, or associated physical buttons), and cameras 110a-b (perception signal). The controller 122 may receive these signals through a number of different communication architectures (e.g., controller area network (CAN), direct point-to-point communication) and through a number of different mediums (e.g., wired connection, wireless connection). The controller 122 also sends signals to the display screen 108 to display content for the operator. In this embodiment, the controller 122 and display screen 108 are each installed in the work vehicle 100 (e.g., a physical screen, a projected heads-up display), but in alternative embodiments one or both of these components may instead be located remote from the work vehicle 100, and an external communication network (e.g., cellular, Wi-Fi, satellite) may be used to keep the various components of the system in communication with each other. As one example, a cellular modem may be installed on the work vehicle 100 in communication with the controller 122, allowing the controller 122 to transmit information to a remote server which then may relay that information to a device (e.g., phone, tablet, computer) containing display screen 108, allowing a user to view forward-looking perception interface 124 remotely from the work vehicle 100. As another example, the controller 122 may wirelessly transmit data to a wearable device worn by a user in the operator station 106 or outside but near to the work vehicle 100, and this wearable device may display the forward-looking perception interface 124 for the user such as through a display in the line of sight of the user.

Figure 2:
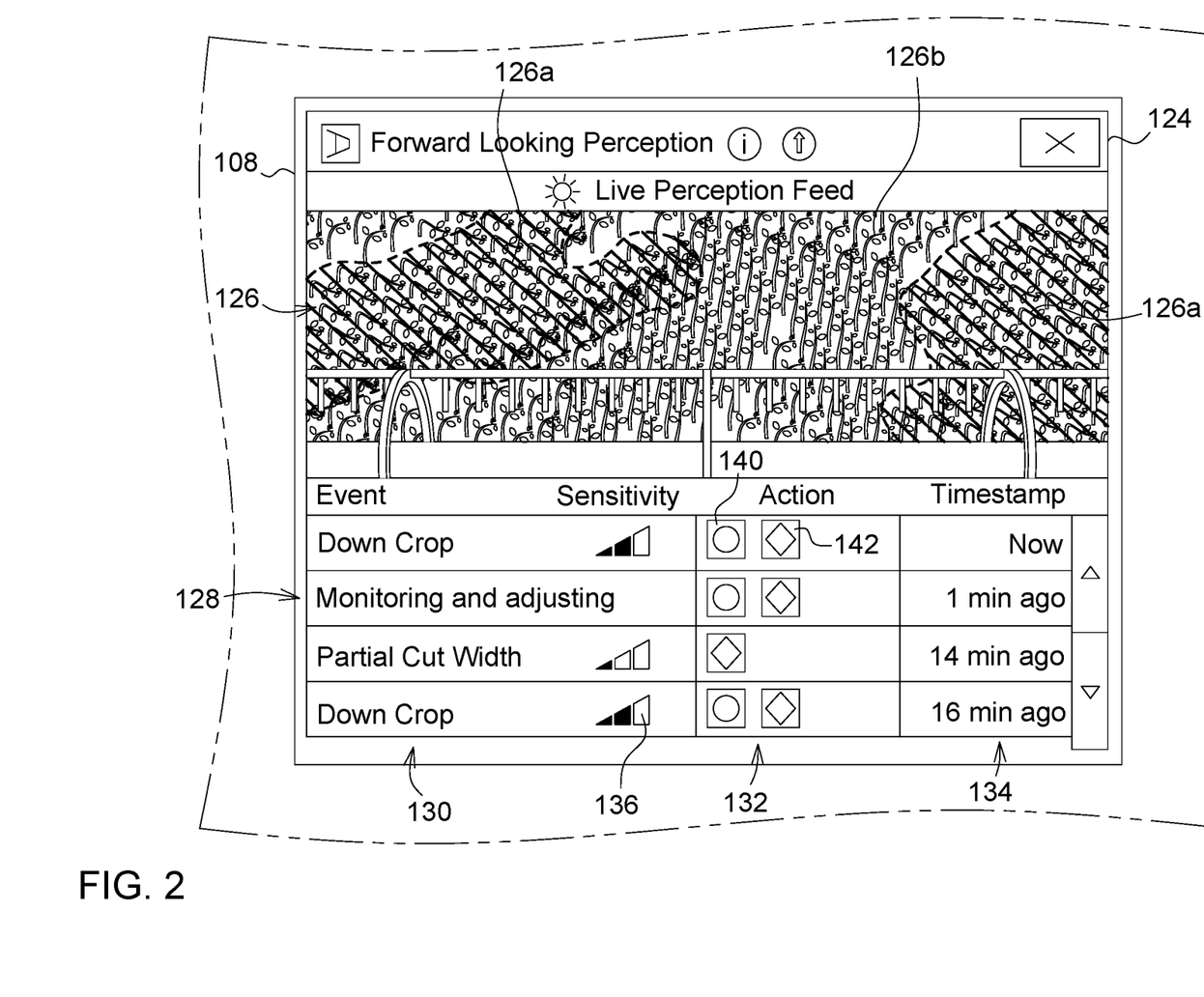
FIG. 2 is a display screen displaying a forward-looking perception interface.
Figure 3:
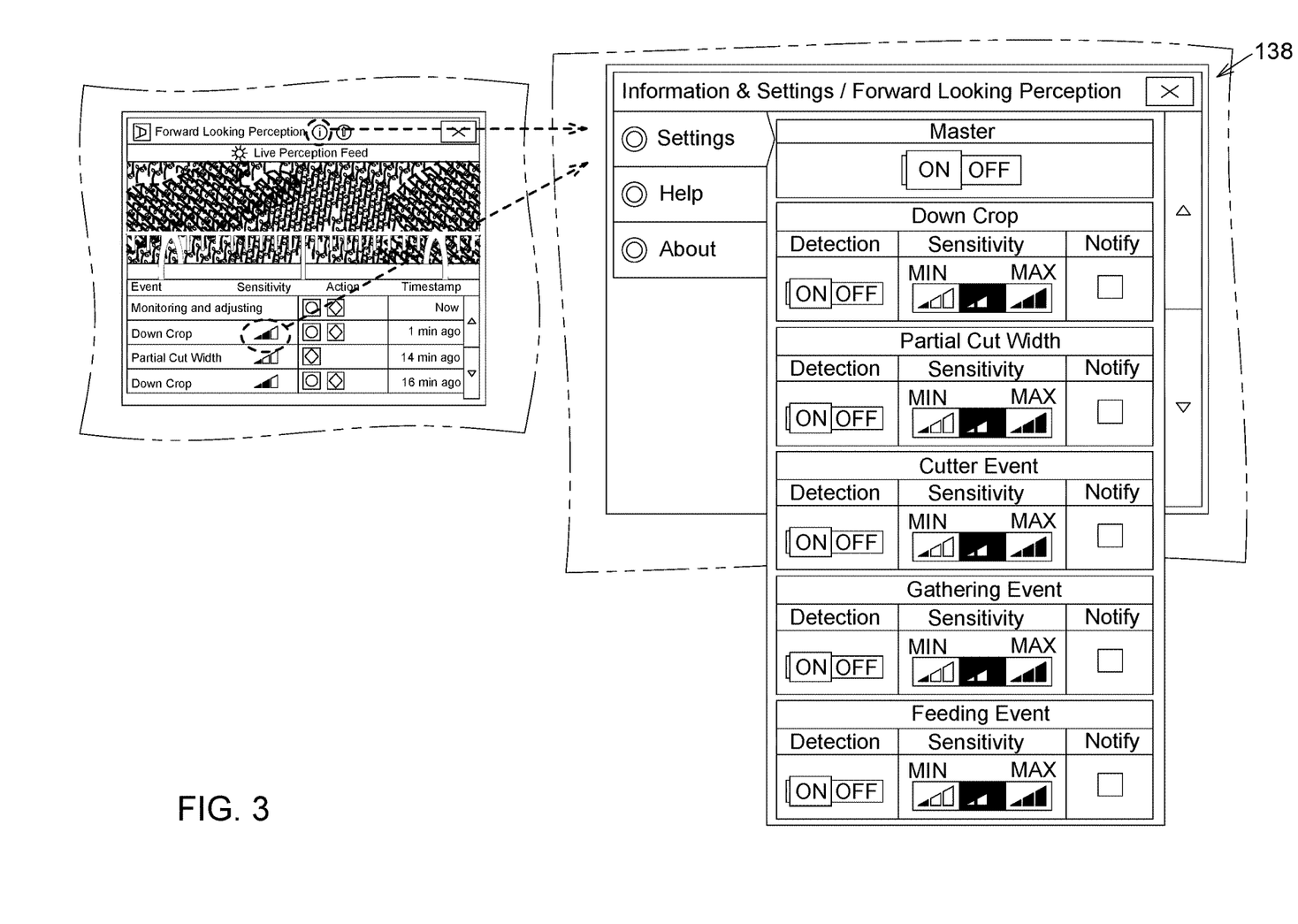
FIG. 3 is the display screen displaying the forward-looking perception interface in a first view, and with a sensitivity adjustment window open in a second view.
Figure 4:
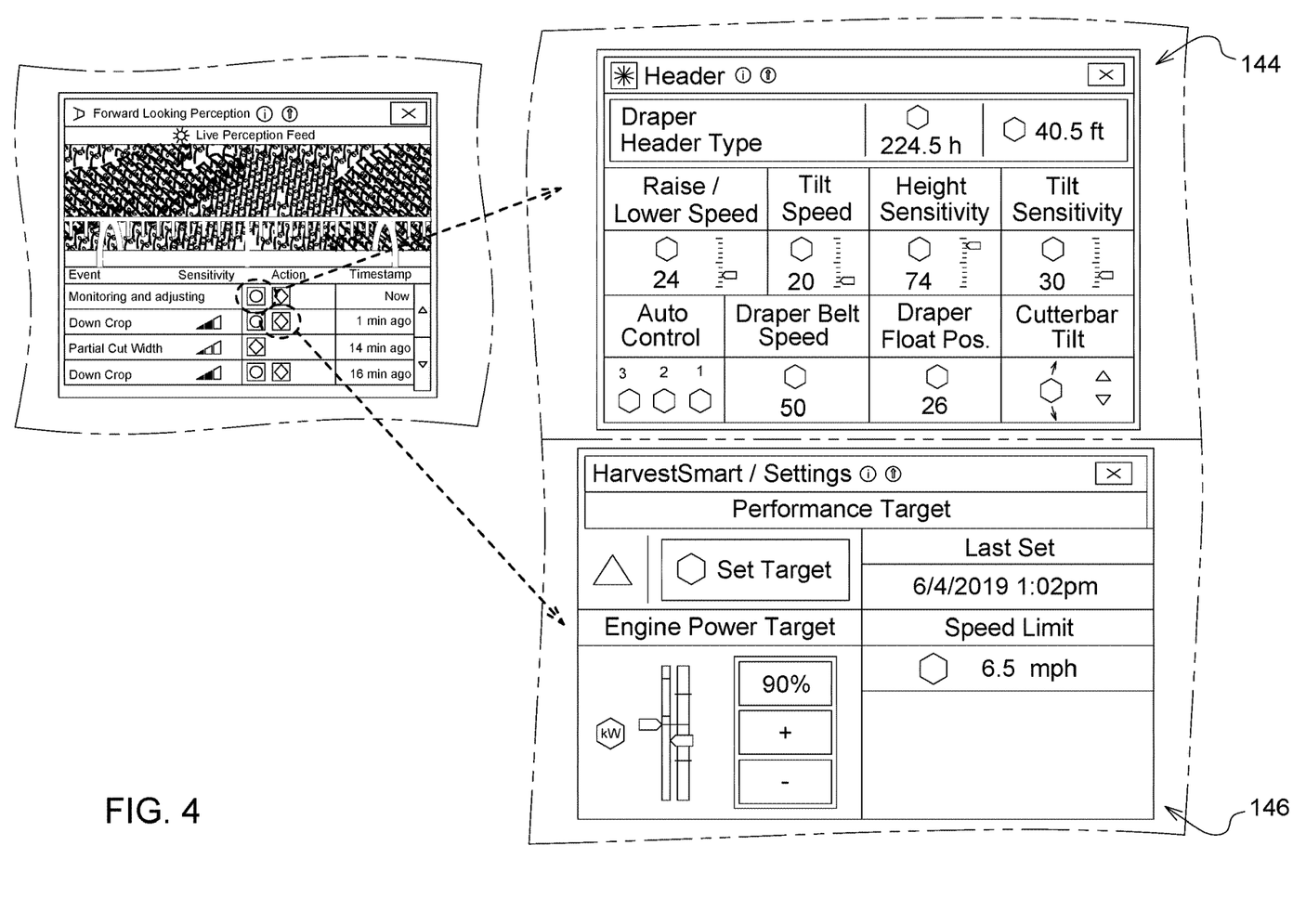
FIG. 4 is the display screen displaying the forward-looking perception interface in the first view, with a first vehicle settings window open in a third view, and with a second vehicle settings window open in a fourth view.

The controller 122 uses the signals it receives to generate a forward-looking perception interface 124, which is displayed on the display screen 108 in FIGS. 2-4. In FIG. 2, the forward-looking perception interface 124 is displayed with just the base view without additional windows open. In FIG. 2, the forward-looking perception interface 124 includes a forward zone area 126 which shows the view using the perception signal from the perception system 109. In this embodiment, this consists of a composited view from cameras 110a-b where the two fields of view have been stitched together to form a single continuous image showing the forward zone 116. This allows the operator or other user of the system to see exactly what the perception system 109 is seeing and what is being used by the controller 122 to determine the harvesting conditions in the forward zone 116, and therefore the harvesting conditions about to be experienced by the work vehicle 100 as it moves forward through the forward zone 116.

The controller 122 uses the perception signal from the perception system 109 to identify one or more harvest conditions in the forward zone 116. The controller 122 can use any number of known techniques for such identification, including contrast analysis, color analysis, and neural networks (with deep, convolutional, recurrent, and other variants thereof), to name just a few techniques for perception classification applicable to image data such as that produced by cameras 110a-b. An example perception classification system is described in further detail in U.S. Published Application No. 2018/0025254, the contents of which are incorporated herein by reference. The harvest conditions which the controller 122 identifies can include conditions like down crop, no crop, partial cut width, light crop, heavy crop, cutting event, gathering event, feeding event, and weed presence.

In the forward zone area 126, the controller 122 may highlight the one or more harvest conditions identified using the perception signal from the perception system 109. The highlight may consist of a different color, texture, or overlay (pattern, image, text) applied to the area containing the harvest condition in the image of the forward zone 116, to bring that area to the user's attention as having a harvest condition. This aspect of the forward-looking perception interface may allow the user the more quickly or easily understand what the controller 122 is basing its classification of a harvest condition on, giving the user more information on which to gauge the performance of the controller 122 at identifying harvest conditions, which may permit the user to better optimize the performance of the controller 122, for example by adjusting a sensitivity level or a vehicle setting.

For example, in the embodiment in FIG. 2, the controller 122 has highlighted area 126a, which indicates to the operator that the controller 122 is interpreting that portion of the crop as "Down Crop." In this embodiment, the area highlighted consists of crop with significant damage which is doubled over and low, so the operator may not want to increase the threshold of the controller 122 to detecting that condition because the controller 122 is not providing false positives. However, the controller 122 is not highlighting the damaged crop 126b, so the operator may choose to decrease the threshold of the controller 122 to detecting down crop if the damaged crop 126b should be identified and highlighted as a "Down Crop" event. How the operator may adjust the threshold is discussed later in this disclosure.

The forward-looking perception interface 124 also includes a status area 128, with a harvest conditions area 130, a vehicle settings area 132, and a time area 134. The status area displays identified harvest conditions in the harvest condition area 130 and an associated time at which that harvest condition was identified or last encountered in the time area 134. The associated time may be an absolute time (e.g., 10:10 am), or it could be a time elapsed as is shown in the embodiment in FIG. 2. The status area 128 in FIG. 2 is organized so that the harvest conditions are listed from most recently encountered at the top of the status area 128 to least recently encountered at the bottom of status area 128. In other embodiments, they may be listed in the opposite chronological order or they may be ordered according to other attributes or factors. FIG. 2 also features an option of having a null harvest condition, here called "monitoring and adjusting," which indicates that no specific harvest condition was identified by the controller 122. Instead, the work vehicle 100 is operating with normal optimization parameters and routines, which may be making more minor adjustments based on variables such as crop density, vehicle power output, and vehicle speed, to name just a few.

The status area 128 also includes a sensitivity level 136 for each of the harvest conditions listed in the harvest conditions area 130. In this embodiment, the sensitivity level 136 is an icon of three trapezoids of increasing height, such that the icon can take on one of four states (i.e., no trapezoids filled, the first filled, the first and second filled, and all three filled) to indicate increasing levels of sensitivity. The display screen 108 is touch-sensitive, and is often referred to as a touchscreen, such that a user may tap or touch the sensitivity level 136 to open a sensitivity window 138 where the user may adjust the sensitivity level or settings associated with the sensitivity level for a particular harvest condition, as described further with regard to FIG. 3. While this disclosure will utilize the term "touch" or "tap," in alternative embodiments the user may select an icon or area using a different means of input, such as the press of a physical button, a mouse or keyboard, or verbal commands.

The vehicle settings area 132 includes a first vehicle settings icon 140 and a second vehicle settings icon 142. Touching the first vehicle settings icon 140 opens up a first vehicle settings window 144, while touching the second vehicle settings icon 142 opens up a second vehicle settings window 146. These will be described further with regard to FIG. 4.

In the embodiment illustrated in FIG. 2, the forward zone area 126 displays that the controller 122 has identified and highlighted an identified harvest condition 148, in this example a down crop condition. The controller 122 has listed "Down Crop" in the harvest conditions area 130 with an associated sensitivity level 136 with two of the three bars filled, displays the first vehicle settings icon 140 and the second vehicle settings icon 142 associated with the "Down Crop" harvest condition in the vehicle settings area 132, and lists the time as "Now" in the time area 134.

In this embodiment, the forward zone area 126 displays damaged crop 126b, where the controller 122 has not identified a down crop harvest condition despite damage to the crop. As shown in the forward zone area 126, the live feed from the cameras 110a-b shows that the crop in highlighted area 126a has suffered significantly more damage than the damaged crop 126b is visually more identifiable as being down crop. Providing this information in the forward-looking perception interface 124, where the live feed only highlights the portions with an identified harvest condition, provides the user with additional information on which to make decisions about the thresholds used by the controller 122 to identify harvest conditions. As one example, if the user of the embodiment in FIG. 2 wants the controller 122 to identify damaged crop 126b as a harvest condition, like highlighted area 126a, the user may decrease the threshold for down crop harvest condition identification.

This adjustment to the threshold may be made by the user on the display screen 108, for example in a settings menu. As another example, if the user sees that the controller 122 is often highlighting harvest conditions in the forward zone area 126 that do not actually exist, the user may increase the threshold for the identification of a harvest condition that the controller 122 is frequently mistakenly identifying. For example, at the lowest threshold, down crop may also be identified if the neural network processing the perception signal produces a value of 0.7 or higher for the down crop condition, while at the medium level it may identify down crop if the value is 0.8 or higher, and at the highest threshold it may identify down crop if the value is 0.9 or higher.

FIG. 3 illustrates how the forward-looking perception interface 124 opens the sensitivity window 138 when the sensitivity level 136 is touched. In this embodiment, the sensitivity window 138 may also be opened by clicking the "i" icon at the top of the forward-looking perception interface 124. The sensitivity window 138 displays the sensitivity levels for a plurality of harvest conditions that the controller 122 may identify. For each harvest condition, the user may select whether to disable identification of that harvest condition, the sensitivity level for that harvest condition, and whether the user choses to be notified of the crop event identification when not monitoring the forward-looking perception interface 124 (e.g., an alert sent to a phone, tablet, or computer).

Changing the sensitivity level for a particular harvest condition may change one or more ways in which the controller 122 adjusts the operation of the work vehicle 100 to better perform for the identified harvest condition. The sensitivity may affect the operation of the work vehicle 100 by affecting how aggressively the operation settings of the work vehicle 100 are changed in response to the harvest condition identified. If the controller 122 identifies a harvest condition in the forward zone 116, it may adjust an operation setting of the propulsion system 118 or the harvesting system 120 to optimize the operation of the work vehicle 100 while it encounters the harvesting condition. As one example, if the work vehicle 100 encounters heavy crop or dense crop, caused by particularly high yield, tough or excessive crop growth, or high crop moisture, the controller 122 may identify a heavy crop harvesting condition and based on this identification, decrease the forward speed of the work vehicle 100 to avoid increasing the load on the harvesting system 120 and causing plugging or reduce performance. As another example, if the controller 122 identifies a light crop harvest condition (or no crop, or partial cut width), it may increase the forward speed of the work vehicle 100 to more fully utilize the capacity of the harvesting system 120. As another example, if the controller 122 identifies a down crop harvest condition, it may lower the cutting height of the harvesting head 101 to better pick up the down crop while also decreasing the forward speed of the work vehicle 100 to avoid overloading the harvesting system 120. As another example, if the controller 122 identifies a cutting event, gathering event, or feeding event, indicating that a problem may be developing with the harvesting head 101, the controller 122 may slow or stop the work vehicle 100 and start, stop, or change the speed of a conveyor, reel, auger, or other part of the harvesting head 101, to see if the issue clears. If it does clear, then the controller 122 may resume the previous harvesting speed and settings, and if it does not clear, the controller 122 may stop the work vehicle 100 and the harvesting system 120, and indicate to the operator which issue has been identified and requires correction.

The controller 122 may use a lookup-table or another similar function to identify the operation settings it should adjust when it identifies a particular harvest condition, and then use that table or another technique to alter the operation setting adjustment based on the sensitivity level. For example, this table may contain multiple entries for each harvest condition, with each entry corresponding to a different sensitivity level (e.g., decrease vehicle speed 15% for low sensitivity, 30% for medium sensitivity, and 45% for high sensitivity). Alternatively, the table may contain only a single entry (e.g., decrease vehicle speed 30%) with the output of the table may be altered using the sensitivity level (e.g., reduce adjustment amount by 50% for low sensitivity, increase adjustment amount by 50% for high sensitivity).

FIG. 4 illustrates how the forward-looking perception interface 124 may open the first vehicle settings window 144 when the first vehicle settings icon 140 is touched or the second vehicle settings window 146 when the second vehicle settings icon 142 is touched. For each harvest condition listed in the harvest conditions area 130 of the forward-looking perception interface 124, the controller 122 may display only the settings icons associated with that harvest condition so that only the most relevant settings icons are presented for the user rather than all possible settings icons. As one example, when a down crop harvest condition is listed, the controller 122 may use a lookup table on the harvest condition to find that both the first vehicle settings icon 140 and the second vehicle settings icon 142 should be listed, because both settings for the harvesting head 101 (first vehicle settings window 144) and settings for the propulsion system 118 (second vehicle settings window 146) may need adjustment when such a harvest condition is encountered. As another example, when a partial cut width harvest condition is identified, only the settings for the propulsion system 118 may be relevant, so only the second vehicle settings icon 142 may be displayed in the vehicle settings area 132 for that harvest condition.

The first vehicle settings window 144 displays values, and allows adjustments, of the operation settings related to the harvesting head 101. In this window, the user may modify the speeds of various components of the harvesting system 120, in this embodiment the harvesting head 101 and draper belts included therein, and the sensitivity of the controller 122 in automatically responding to height and tilt adjustments, among other items.

The second vehicle settings window 146 displays values, and allows adjustments, of the operation settings related to the propulsion system 118. In this window, the user may modify the engine power target and see the speed limit of the work vehicle 100. In other embodiments, further options may be available, such as settings for an engine other than a target power (e.g., engine speed, engine sensitivity/responsiveness to load), settings for the transmission (e.g., mechanical, hydraulic, electric), and ability to set speed targets and limits.

In the embodiment illustrated in FIGS. 1-4, the display screen 108 is a touchscreen device located in the operator station 106 of the work vehicle 100. In embodiments with alternative systems for user input, the display screen 108 may not be a touchscreen, but a user may instead select a particular icon or area with an alternative input device, such as a mouse, trackpad, buttons, keyboard, or other user input device. In other alternative embodiments, the display screen 108 may not be located within the operator station 106 or on the work vehicle 100 at all, but instead may be a phone, tablet, or monitor of a computing device located remotely to the work vehicle 100. Such a remote display screen 108 may communicate with the controller 122 through wireless networks, such as Wi-Fi, cellular, or satellite, either directly or using an intermediary such as a server. Such alternatives may allow a farm manager or remote operator to interface with the forward-looking perception system 109 via the forward-looking perception interface 124 without necessitating a physical presence.

Without in any way limiting the scope, interpretation, or application of the claims appearing below, a technical effect of one or more of the example embodiments disclosed herein is to provide an interface that improves how a user understands what the work vehicle 100, via the controller 122, is identifying as harvest conditions using the perception system 109. Another technical effect of one or more of the example embodiments disclosed herein is that the work vehicle 100 may modify its operation settings, specifically those relating to its propulsion system 118 or its harvesting system 120, using harvest conditions identified by the perception system 109. Another technical effect of one or more of the example embodiments disclosed herein is reducing the complexity of modifying sensitivity or vehicle settings by allowing a user to move straight into windows for those settings from the forward-looking perception interface 124.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An agricultural work vehicle, comprising:
   a propulsion system configured to modify a speed of the vehicle;
   a harvesting system configured to harvest a crop;
   a perception system configured to provide a perception signal, the perception system including at least one camera, the at least one camera having a field of view including at least a portion of a forward zone in front of the vehicle; and
   a controller in communication with the propulsion system, harvesting system, perception system, the controller configured to:
   receive the perception signal;
   identify, using the perception signal, a harvest condition in the forward zone;
   adjust, using the harvest condition, an operation setting of the propulsion system or harvesting system; and
   generate a forward-looking perception interface for a display screen, comprising:
   a forward zone area displaying, using the perception signal, the field of view; and
   a status area displaying at least one harvest condition identified, the status area displaying a time and a sensitivity level associated with the at least one harvest condition identified.

2. The agricultural work vehicle of claim 1, wherein the forward-looking perception interface further comprises a forward zone area displaying the field of view, the forward zone area highlighting a portion of crop in the field of view having the harvest condition.

3. The agricultural work vehicle of claim 1, wherein the display screen is configured to accept touch input, and the controller is configured to open a sensitivity adjustment window when the sensitivity level is touched.

4. The agricultural work vehicle of claim 3, wherein the sensitivity adjustment window displays sensitivity settings which the controller uses to determine the sensitivity level, and at least a portion of the sensitivity settings are user-modifiable in the sensitivity adjustment window.

5. The agricultural work vehicle of claim 4, wherein the forward-looking perception interface further comprises a forward zone area displaying the field of view, the forward zone area highlighting a portion of crop in the field of view having the harvest condition.

6. The agricultural work vehicle of claim 3, wherein the status area further comprises a vehicle settings icon associated with the harvest condition identified, and the controller is configured to open a vehicle settings window when the vehicle settings icon is touched.

7. The agricultural work vehicle of claim 6, wherein the vehicle settings window displays vehicle settings which the controller uses to operate the propulsion system or harvesting system.

8. The agricultural work vehicle of claim 7, wherein the forward-looking perception interface further comprises a forward zone area displaying the field of view, the forward zone area highlighting a portion of crop in the field of view having the harvest condition.

9. The agricultural work vehicle of claim 3, wherein the status area further comprises a first vehicle settings icon and a second vehicle settings icon different than the first vehicle settings icon, each of the first vehicle settings icon and second vehicle settings icon associated with the harvest condition identified, and the controller is configured to open a first vehicle settings window when the first vehicle settings icon is touched and a second vehicle settings window different than the first vehicle settings window when the second vehicle settings icon is touched.

10. The agricultural work vehicle of claim 2, wherein the status area comprises a plurality of harvest conditions identified and the plurality of harvest conditions are displayed in ascending or descending order according to the time associated with each of the harvest conditions.

11. An agricultural work vehicle, comprising:
a propulsion system configured to modify a speed of the vehicle;
a harvesting system configured to harvest crop;
a perception system configured to provide a perception signal, the perception system including at least one camera, the at least one camera having a field of view including at least a portion of a forward zone in front of the vehicle;
a display screen; and
a controller in communication with the propulsion system, harvesting system, perception system, and display screen, the controller configured to:
receive the perception signal;
identify, using the perception signal, a harvest condition for crop in the forward zone;
adjust, using the harvest condition, an operation setting of the propulsion system or harvesting system; and
generate a forward-looking perception interface for the display screen comprising a forward zone area displaying, using the perception signal, the field of view, the forward zone area highlighting a portion of crop in the field of view having the harvest condition.

12. The agricultural work vehicle of claim 11, further comprising a status area displaying a harvest condition identified, the status area displaying a time and a sensitivity level associated with the harvest condition identified.

13. The agricultural work vehicle of claim 11, wherein the status area comprises a plurality of harvest conditions identified and the plurality of harvest conditions are displayed in ascending or descending order according to the time associated with each of the harvest conditions.

14. A method of controlling a work vehicle with a harvesting system comprising:
receiving a perception signal from a perception system including at least one camera, the at least one camera having a field of view including at least a portion of a forward zone in front of the vehicle, the forward zone containing crop in an unharvested state;
identifying, using the perception signal, a harvest condition for crop in the forward zone;
adjusting, using the harvest condition, an operation setting of the propulsion system or harvesting system; and
generating a forward-looking perception interface for a display screen, the forward-looking perception interface comprising:
a forward zone area displaying, using the perception signal, the field of view, the forward zone area highlighting a portion of crop in the field of view having the harvest condition; and
a status area displaying at least one harvest condition identified, the status area displaying a time, a sensitivity level, and a vehicle setting icon associated with the at least one harvest condition identified.

15. The method of claim 14, wherein the status area comprises a plurality of harvest conditions identified and the plurality of harvest conditions are displayed in ascending or descending order according to the time associated with each of the harvest conditions.

* * * * *